United States Patent
Sathiavageeswaran et al.

(10) Patent No.: US 7,248,622 B2
(45) Date of Patent: Jul. 24, 2007

(54) LOW-POWER CODE DIVISION MULTIPLE ACCESS RECEIVER

(75) Inventors: Karthik Sathiavageeswaran, Madras (IN); Christopher A. Aldridge, Singapore (SG); Mohamed Imtiyaz Iqbal, Bangalore (IN)

(73) Assignees: STMicroelectronics Asia Pacific Pte. Ltd., Singapore (SG); National University of Singapore, Singapore (SG)

( * ) Notice: Subject to any disclaimer, the term of this patent is extended or adjusted under 35 U.S.C. 154(b) by 704 days.

(21) Appl. No.: 10/618,073

(22) Filed: Jul. 11, 2003

(65) Prior Publication Data

US 2004/0057538 A1 Mar. 25, 2004

Related U.S. Application Data

(63) Continuation of application No. 10/298,150, filed on Nov. 15, 2002, now abandoned.

(30) Foreign Application Priority Data

Nov. 17, 2001 (SG) .............................. 200107115-8

(51) Int. Cl.
*H04B 1/00* (2006.01)

(52) U.S. Cl. ...................... 375/147; 375/148; 375/150

(58) Field of Classification Search ................ 375/130, 375/140, 142, 147, 144, 148, 150, 343
See application file for complete search history.

(56) References Cited

U.S. PATENT DOCUMENTS

| | | | |
|---|---|---|---|
| 4,774,715 A * | 9/1988 | Messenger | 375/149 |
| 5,872,466 A | 2/1999 | Shou et al. | 327/552 |
| 5,956,333 A | 9/1999 | Zhou et al. | 370/342 |
| 5,974,038 A | 10/1999 | Shou et al. | 370/335 |
| 6,014,405 A | 1/2000 | Garodnick et al. | 375/200 |
| 6,029,052 A | 2/2000 | Isberg et al. | 455/131 |
| 6,678,312 B1 * | 1/2004 | Mohindra | 375/150 |
| 2002/0146080 A1 * | 10/2002 | Dress et al. | 375/316 |

FOREIGN PATENT DOCUMENTS

WO WO 01/47128 * 6/2001

* cited by examiner

*Primary Examiner*—Tesfaldet Bocure
(74) *Attorney, Agent, or Firm*—Lisa K. Jorgenson; Dennis M. de Guzman; Seed IP Law Group PLLC

(57) ABSTRACT

A low-power receiver architecture of use in direct sequence spread spectrum communications system receivers, such as in a code division multiple access system, is provided. The receiver employs analog correlation, wherein its analog-digital, converters are able to operate at the system symbol rate, and the requirement for finite impulse response filters is obviated. The low-power receiver architecture is also applicable as a front-end structure for multiple-mode receivers.

25 Claims, 4 Drawing Sheets

LOW-POWER CODE DIVISION MULTIPLE ACCESS RECEIVER

CROSS-REFERENCE TO RELATED APPLICATION

This application is a continuation of U.S. patent application Ser. No. 10/298,150, filed on Nov. 15, 2002; now abandoned which application is incorporated herein by reference in its entirety.

BACKGROUND OF THE INVENTION

1. Field of the Invention

This invention relates to wireless communications systems, and in particular but not exclusively to wireless communications signal receivers suitable for use in direct-sequence spread spectrum systems such as those employing code division multiple access (CDMA) techniques.

2. Description of the Related Art

In a standard CDMA receiver, digital correlation techniques are conventionally employed, involving an analog-to-digital converter (ADC) that operates at typically four times the chip rate. In currently proposed third-generation communication systems that rate may be in the region of 16 MHz. In addition to the ADC, a high-order square-root raised cosine filter is also required on the receiver side to obtain optimal performance. If this filter is implemented by digital means, it would also typically operate at four times the chip rate.

One of the primary applications for CDMA communications systems is in cellular telecommunications, where receiver circuitry is incorporated in a portable handset or the like. In order to extend the battery life for operation of the portable handset, it is desirable to utilize circuitry therein that is as power efficient as possible. It is therefore desirable for the handset circuitry, such as that in the CDMA receiver, to be low in power consumption. One way in which power consumption can be reduced is to reduce the rate of operation of processing components such as analog-to-digital converters and the like.

BRIEF SUMMARY OF THE INVENTION

In accordance with an embodiment of the present invention, there is provided a direct sequence spread spectrum receiver. The receiver includes amplifying and filtering circuitry for obtaining a direct sequence spread spectrum received signal, and a spreading code signal generator circuit for generating an analog spreading code signal. The receiver further includes analog correlation detection circuitry for detecting correlation between said received signal and said spreading code signal to produce an analog correlation signal, and analog-to-digital conversion circuitry for generating a digital data signal from said analog correlation signal.

An embodiment of the present invention also provides a method for receiving and decoding a direct sequence spread spectrum signal in which a digital data signal having a baseband frequency is combined with a digital spreading code sequence and modulated for transmission at a carrier frequency. The method includes amplifying and filtering a received direct sequence spread spectrum signal, and generating an analog spreading code signal corresponding to the transmission spreading code sequence. Analog correlation detection is performed between the received signal and the spreading code signal to obtain a correlation signal. Then, analog-to-digital conversion is applied to the correlation signal to obtain a replica of the digital data signal.

Embodiments of the present invention as disclosed in detail hereinbelow, include a new low-power receiver architecture which employs analog correlation, with the implication that the ADCs operate at the symbol rate instead of the chip rate as required in conventional receiver structures. In 3rd generation systems spreading factors up to 256 are employed, and in the case of four times over-sampling the ADCs in the new receiver architecture could therefore operate at 1/1024th (256×4) of the chip rate.

In this structure, the analog correlation does not necessarily need to take place at baseband and correlation at an IF frequency (or at RF frequency itself) is considered. Similarly, it is not necessary to correlate the received signal using a digital chip sequence. The correlation signal can be an analog equivalent to the digital chip sequence that may not even require pre-filtering using a square-root raised cosine filter. Using this method, the receiver RRC filter (as well as any alternate digital filter for that purpose) may be removed.

Applications for the low-power receiver architecture include portable telecommunications devices. The architecture may be used as front-end structure for multimode receivers.

BRIEF DESCRIPTION OF THE SEVERAL VIEWS OF THE DRAWINGS

The invention is described in greater detail hereinafter, by way of example only, and with reference to embodiments thereof illustrated in the accompanying drawings, wherein.

DETAILED DESCRIPTION OF THE INVENTION

Embodiments of a Low-Power Code Division Multiple Access Receiver are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In order to provide a thorough understanding of the present invention, its operation and advantages, the concept and operation of a standard CDMA receiver is first described hereinbelow by way of background.

Figure 1:
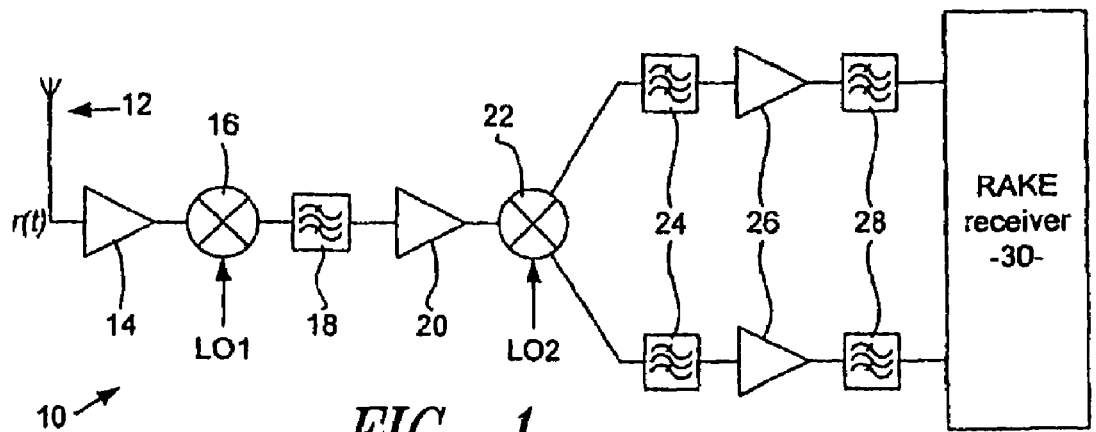
FIG. 1 is a block diagram of a standard CDMA receiver.

A conventional CDMA receiver circuit 10 is shown in block diagram form in FIG. 1, which obtains a received signal (r(t)) from an antenna 12. The antenna 12 is coupled to pass the received signal to a low-noise amplifier (LNA) 14, having its output coupled to an input of a first mixer circuit 16. The first mixer circuit 16 mixes the amplified received signal with a signal derived from a first local oscillator LO1, and the output is passed to a lowpass filter 18. The output of the lowpass filter 18 is coupled to the input of an automatic gain control (AGC) circuit 20, which in turn provides input to a second mixer circuit 22.

At the second mixer 22, the signal is down-converted to baseband by mixing with a second local oscillator signal (LO2) and split into in-phase (I) and quadrature (Q) components, which are respectively passed to lowpass filters 24. The outputs of filters 24 are coupled to respective analog-digital converters (ADCs) 26, which are in turn connected to respective 48-tap finite impulse response (FIR) filters 28. The outputs derived from the FIR filters 28 are then provided to a RAKE receiver 30.

The operation of the conventional CDMA receiver 10 is described in greater detail below.

Generally, the signal received from the communications channel at the antenna 12 is corrupted by noise, delayed and attenuated. For the purposes of explanation, let the received signal be represented by r(t)=s(t)+n(t), where s(t) refers to the signal content and n(t) refers to the Additive White Gaussian Noise (AWGN). The AWGN is made up from thermal noise due to the receiver components, and interference. For the present discussion, it is acceptable to ignore the AWGN component.

The AWGN that enters the receiver along with the signal is typically filtered and becomes band-limited. Finally, when it is split into in-phase and quadrature-phase elements, the statistics of the noise contained in the in-phase and quadrature-phase signals remain orthogonal to one another and retain AWGN properties.

The received signal r(t) is first amplified by the low-noise amplifier (LNA) 14 and output to the first mixing stage 16. The noise figure of the receiver tells us how much the thermal noise will deteriorate the incoming signal. Since the overall noise figure of the system is greatly contributed by the first component, it is essential that the LNA 14 have very low noise characteristics (typically between 1 and 4 dB).

At the input of the first mixer 16, the received signal is analog and is at a carrier frequency of $\omega_c=2\pi f_c$. This is mixed with $\omega_{LO1}=\omega_c-\omega_1$, where $\omega_1$, is the first intermediate frequency (IF) and where $\omega_{LO1}$ is derived from the local oscillator LO1.

Expressing these operations mathematically:

$$\text{let } r(t)=\cos(\omega_c t+\phi(t)+\xi), \tag{1}$$

where $\phi(t)$ is the modulation phase and $\xi$ is any arbitrary phase delay.

After mixing, we obtain $$x(t)=\cos(\omega_c t+\phi(t)+\xi)\cdot\cos((\omega_c-\omega_1)t)$$

$$x(t)=0.5\cos((2\omega_c-\omega_1)t+\phi(t)+\xi)+0.5\cos(\omega_1 t+\phi(t)+\xi). \tag{2}$$

The first term of Equation (2), above, is a high frequency term and is subsequently filtered off by the lowpass filter 18. Only the second term, which is basically the received signal down-converted to $\omega_1$, remains and is passed to the next stage.

An Automatic Gain Control (AGC) stage 20 after the lowpass filter 18 is used to increase the signal amplitude and is generally applied after the first mixer. In second and third generation communication systems, the control mechanism for the AGC is typically derived from the power measurement of the demodulated in-phase (I) and quadrature (Q) signals. These algorithms are normally performed by a baseband digital signal processor.

The signal is then presented to a second mixer (complex) 22 that down-converts the signal to baseband and also splits it into its in-phase and quadrature components. Thus, the signal is orthogonalized. The second mixing frequency $\omega_{LO2}$ is at $\omega_1$ and is derived from the local oscillator LO2.

From Equation (2), after the low-pass filter and AGC stages, the second term can be obtained as:

$$y(t)=0.5\cos(\omega_1 t+\phi(t)+\xi). \tag{3}$$

This is mixed with $\cos\omega_1$ to obtain the in-phase component and with $\sin\omega_1$ for the quadrature component. The resulting orthogonal components can be expressed as:

$$z_I(t)=0.25\cos(2\omega_1 t+\phi(t)+\xi)+0.25\cos(\phi(t)+\xi) \tag{4}$$

and $$z_Q(t)=0.25\sin(2\omega_1 t+\phi(t)+\zeta)-0.25\sin(\phi(t)+\zeta). \tag{5}$$

The respective in-phase and quadrature lowpass filters 24 remove the $2\omega_1$ term from the components represented above, and only the baseband part of the received signal is retained. After the filtering, the baseband analog received signal is digitized by the respective analog-digital converters (ADCs) 26 before being filtered by respective 48-tap FIR filters 28 programmed with a root-raised cosine (RRC) profile.

In third generation systems currently proposed, the chip-rate of the signal is 3.84 Mcps. As stated by Nyquist, the sampling rate must be at least twice the bandwidth of the signal. Typically, the ADC samples are at four times the chip rate and the output signal is 4-8 bits per sample. The purpose of the FIR filter is to band-limit the noise to the same bandwidth as that of the signal, and to give a raised cosine transfer function when the path from the transmitter to the receiver is considered.

After passing through the FIR filter, the digitized in-phase and quadrature components of the signal are available for despreading by a RAKE receiver. The RAKE receiver utilizes the concept of "time diversity" to combine signals that have been delayed due to various paths between the transmitter and the receiver. It has a number of correlators or "fingers", and each finger is used to despread one of the paths. Typical RAKE receiver designs use 3, 4 or 5 fingers to deal with signals that have multipath components. One such finger is shown in block diagram form in FIG. 2.

Figure 2:
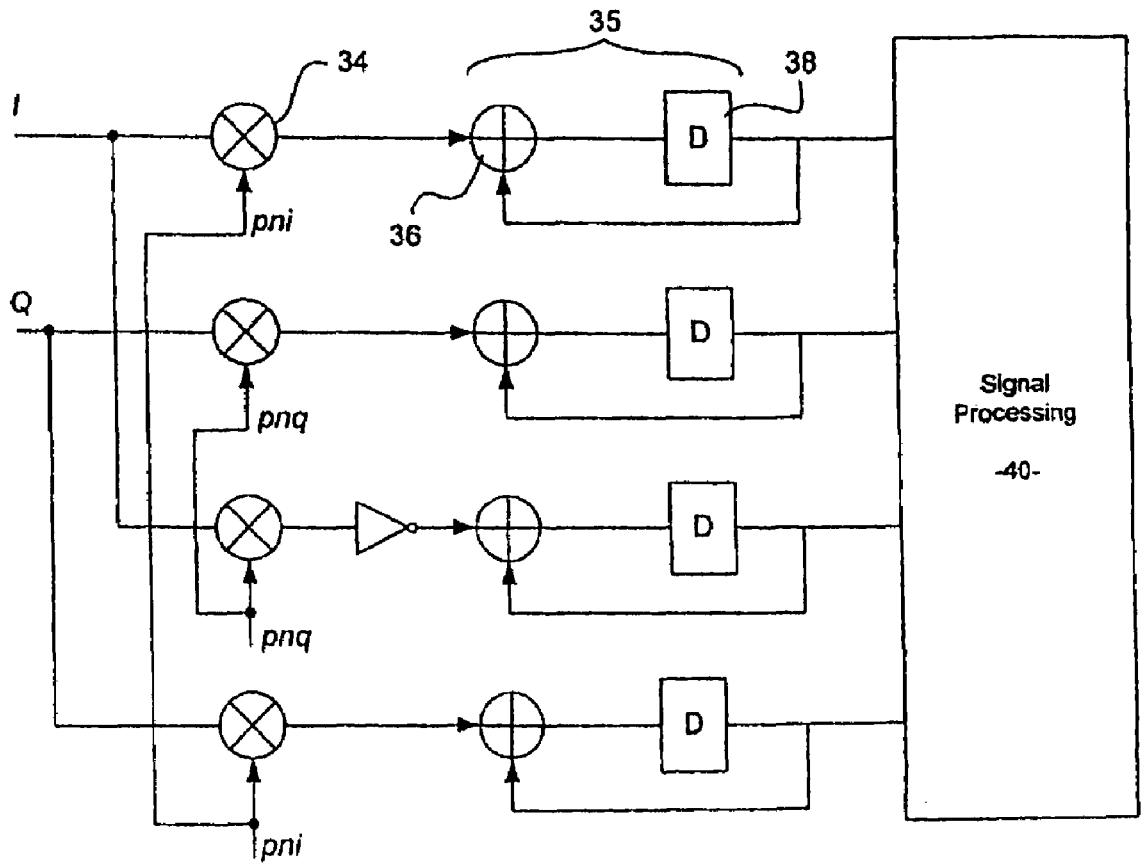
FIG. 2 is a block diagram of a correlator ("finger") of a RAKE receiver.

FIG. 2 is a representation of a typical single finger 32 of a RAKE receiver. The digitized signal in the form of I and Q components must be correlated in order to achieve despreading so as to yield the desired information bits following signal processing. The I and Q signal components are multiplied (34) with an exact replica of the complex OVF+scrambling code signal (represented in complex form as pni and pnq), and correlation is performed via the integrator 35. The integrator 35 is constructed from an adder (36) and delay element (38) with a particular time delay D that is estimated from baseband algorithms. The correlated signal is then subjected to signal processing (40) to obtain the reconstructed information bits. Other RAKE fingers perform the same operation with different delays to achieve the despreading. The signal-processing block (40) illustrated represents all of the processes that are involved following the correlation process required to reconstruct the originally transmitted data sequence. In the immediate context of the RAKE receiver, this would include a channel-decoder for forward-error correction.

In each finger of the RAKE receiver, the received signal is correlated against the combined scrambling and OVSF codes. This sequence is termed (pni+j.pnq). Here, we assume that the (pni+j.pnq) is time-synchronized with the transmitter to result in demodulation.

Expressed mathematically, the output from the correlator can be given as:

$$\sum_{0}^{255}(I+jQ)\cdot(pni-jpnq) \cong \sum_{0}^{255}((I\cdot pni + Q\cdot pnq) + j(Q\cdot pni + I\cdot pnq)) \quad (6)$$

From Equation (6), take the real part to arrive at the final despread signal. Then, after each RAKE receiver finger, the real part of each signal can be summed directly to arrive at the final despread signal in what is known as a non-coherent receiver.

Figure 3:
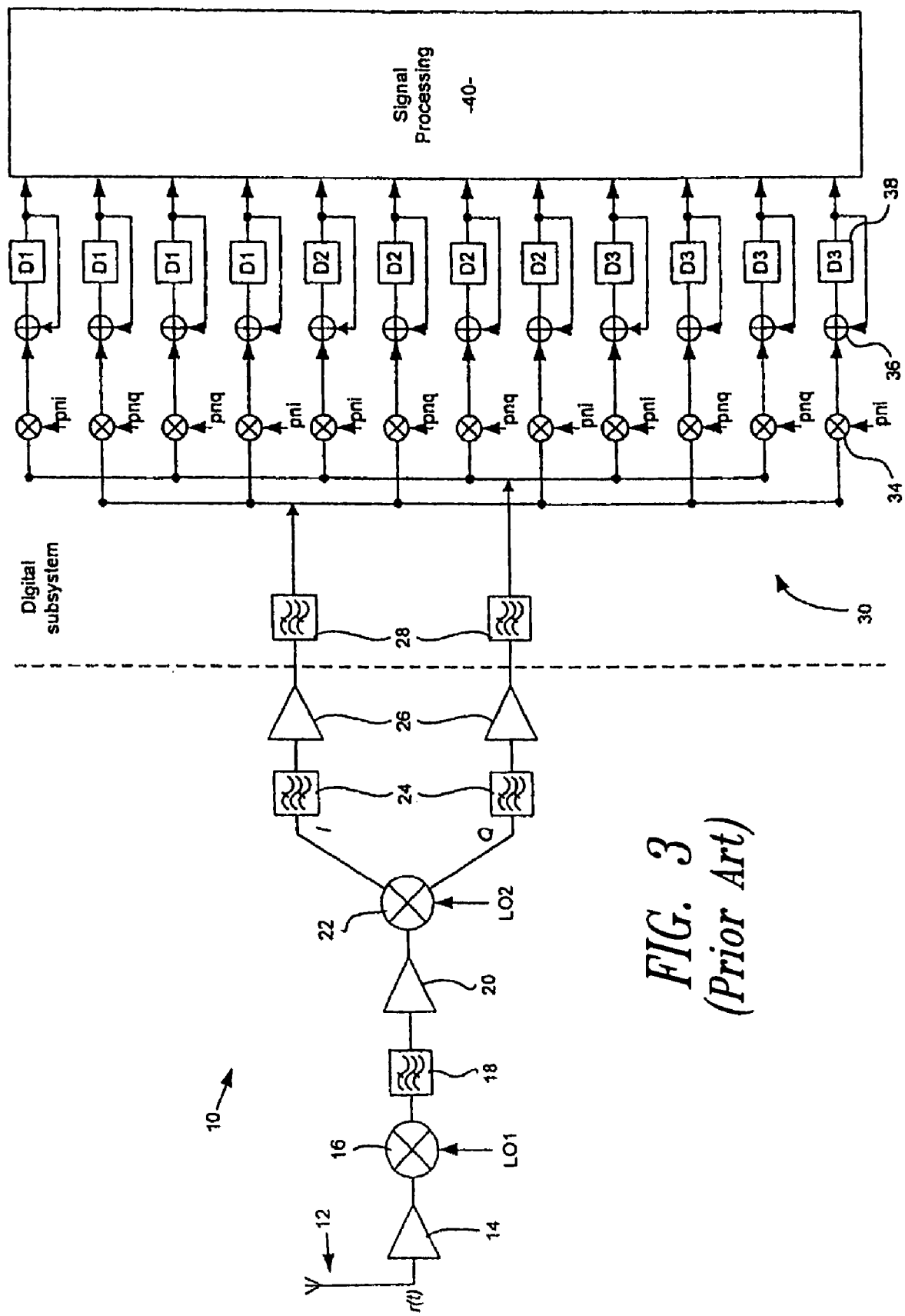
FIG. 3 is a block diagram of a conventional receiver structure showing three fingers of the RAKE receiver.

In a coherent receiver, the pilot code determines the amplifier gain and these amplifiers, placed after the correlator, can amplify both the real and imaginary parts of the correlated signal. Used typically in CDMA, the pilot code helps to obtain a form of weighting based on the quality of the despread signal (also the SNR). This helps to provide an optimum signal to the subsequent stages of the receiver. A detailed diagram of the conventional receiver showing the RAKE (with three fingers) is presented FIG. 3.

The above described receiver structure is commonly used in current CDMA receivers. However, because of the high sampling rate of the ADCs (26), and the size and operating speed of the FIR filters involved, the power consumption is relatively high. Reduction of power consumption is one of the ways of optimizing receiver architectures and the present trends in receiver design are towards low-power architectures. A low-power receiver may be the distinguishing feature in a successful product. Accordingly, an embodiment of a new low-power receiver structure is disclosed herein which employs analog correlation with the implication that the ADCs can operate at the symbol rate instead of the chip rate. In third generation systems where spreading factors up to 256 are employed, this means that the ADCs can operate at 256 times less frequency.

Using this structure, the analog correlation does not necessarily need to take place at baseband and correlation at an IF frequency (or at RF frequency itself is possible. Similarly, it is not necessary to correlate the received signal using a digital chip sequence. The correlation signal can be an analog sequence that is a digital chip sequence that may not even require pre-filtering using the square-root raised cosine filter. Using this method, the receiver RRC filter (as well as any alternate digital filter for that purpose) may be removed.

In the above description of the conventional CDMA receiver, it was mentioned that the use of digital correlation techniques requires sampling to be performed at four times the chip rate, and subsequent digital circuits have to operate at this rate until the symbol is despread. This high rate implies the usage of much power.

Figure 4:
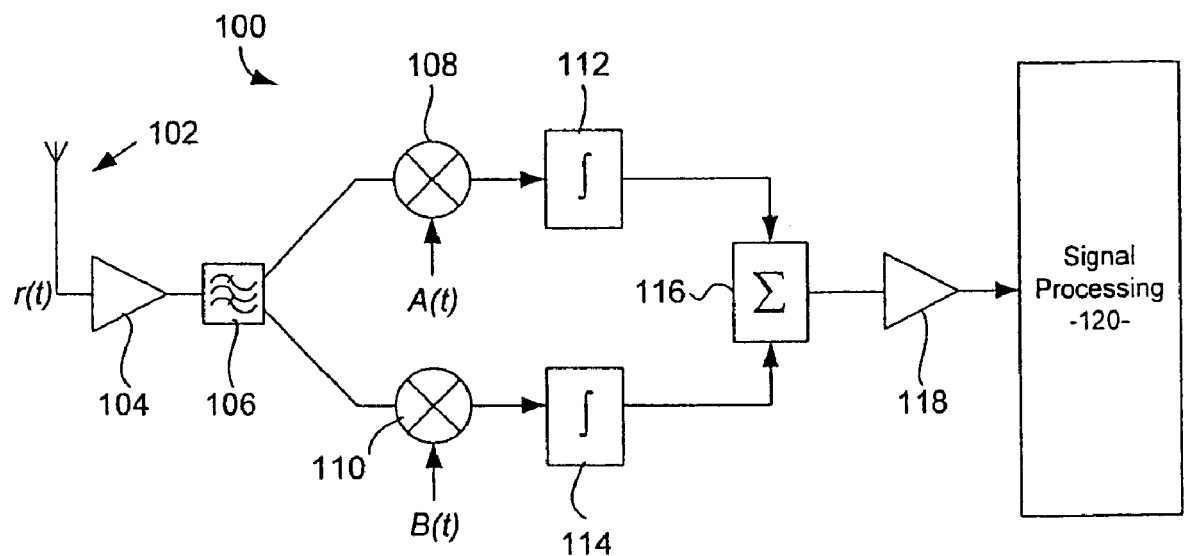
FIG. 4 is a block diagram of a receiver constructed according to an embodiment of the present invention.
Figure 6:
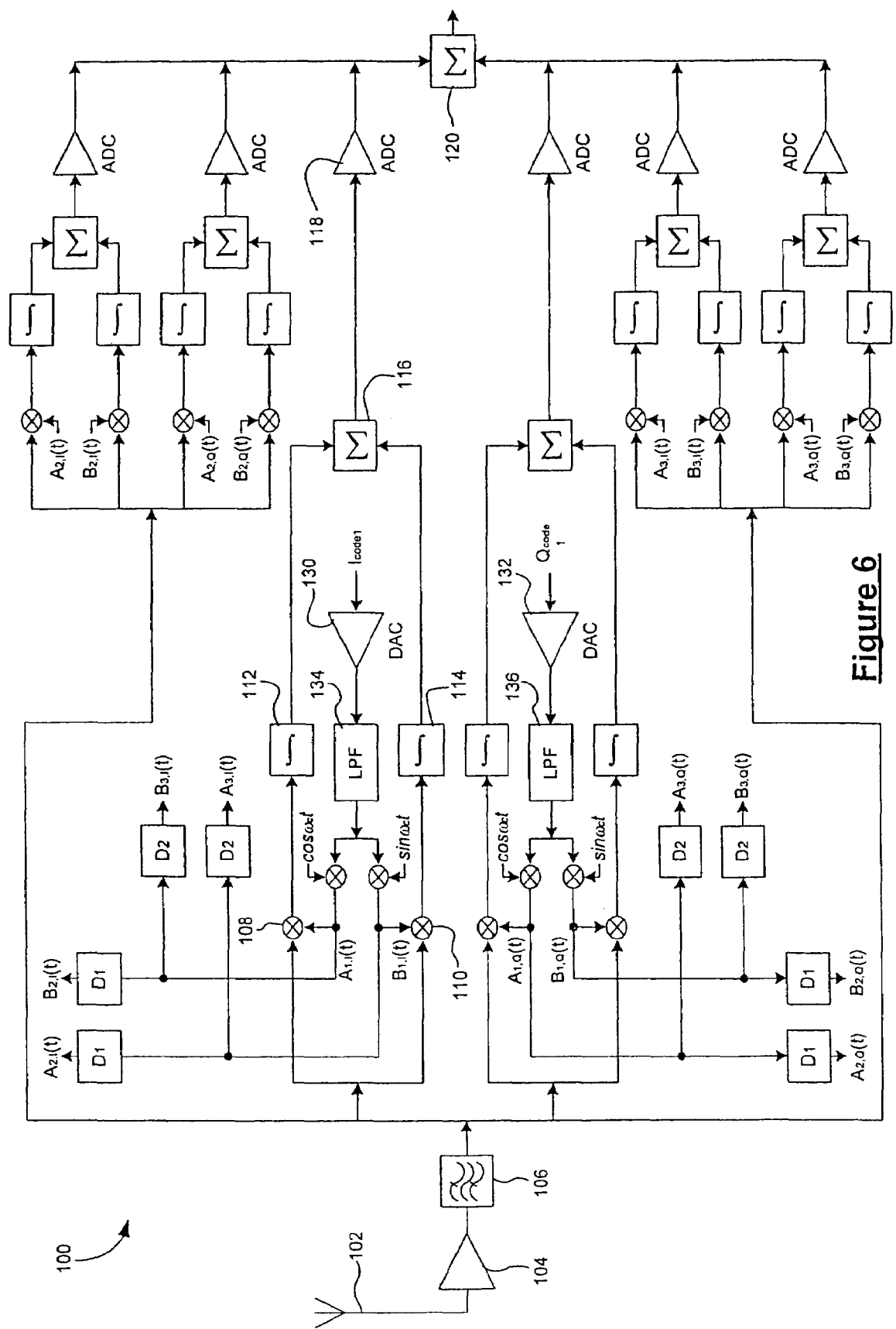
FIG. 6 is a more detailed block diagram of a receiver constructed according to an embodiment of the present invention, showing three fingers of the RAKE.

A block diagram of a receiver circuit 100 constructed according to an embodiment of the present invention is shown in FIG. 4. The circuit 100 resembles the conventional receiver circuit in some respects, although in this case most of the elements employed therein operate in the analog rather than digital domain. FIG. 6 represents a more detailed block diagram of the receiver circuit of an embodiment of the present invention, illustrating the generation of the despreading sequence, which is assumed to be time-synchronized to the transmission source.

The structure of the receiver circuit 100 shown in FIG. 4 is as follows. An antenna 102 is provided to obtain a received signal r(t) which is provided to a low-noise amplifier (LNA) circuit 104. The amplified signal is output from the LNA 104 to a bandpass filter 106. The bandpass filter 106 is required to filter the incoming RF signal to the frequency band that is intended for the system and architecture. In the case of a wideband code division multiple access (WCDMA) system, for example, the receiver bandwidth might typically be of 60 MHz bandwidth between 2110 MHz and 2170 MHz. The function of the bandpass filter is to reject out-of-band signals, which may be spurious emissions or other unwanted signals. The preferable characteristics of the bandpass filter are low-loss, minimum ripple in the passband and good roll-off characteristics.

The output from the bandpass filter 106 is provided to respective in-phase and quadrature analog mixer circuits 108, 110. At the in-phase mixer circuit 108 the received signal is mixed with an in-phase component of an analog replica of the spreading code sequence A(t), whilst at mixer 110 the received signal is mixed with a quadrature component of the analog spreading code sequence B(t). The outputs from the mixers 108, 110 are coupled to respective analog integrator circuits 112, 114 where integration of the respective mixed signals takes place over a symbol period to yield the in-phase and quadrature despread signals. These signals are combined by an analog summing circuit 116, the output of which is coupled to the input of an analog-digital converter (ADC) 118. The output of ADC 118 is coupled to signal processing circuitry 120 which provides the decoded data signal. The signal processing circuitry 120 may perform processing operations in a similar manner to the signal processing performed in connection with a conventional receiver architecture such as that shown and described in relation to FIGS. 1-3.

It is apparent that one of the differences in the receiver circuit 100 as compared to the circuit structure of the conventional receiver is that the FIR filters have been removed from the structure. This is made possible due to the fact that correlation is done in the analog domain rather than the digital domain. This also means that correlation does not necessarily have to be done at baseband. Correlation can thus be carried out at any intermediate frequency or even at the carrier frequency.

With exception to the correlation being performed in the analog domain and the fact that FIR filter has been removed from the structure, the architecture of the receiver circuit 100 is actually quite similar to the conventional receiver circuit architecture 10. Functionally, however, the ADCs in the new receiver circuit 100 are able to sample at the symbol rate of the system, as opposed to a multiple of the chip rate required of the ADCs in the conventional receiver circuit. Even though the number of ADCs is increased in the new circuit structure, the power consumed will be lower due to the drastic reduction in the speed of operation (to the order of the spreading factor of the system).

In order to illustrate that the correlation of the received signal can be accomplished at any intermediate frequency including the carrier frequency, the entire process of transmission to correlation is briefly explained hereinbelow, having reference to a simple block diagram of the transmitter-end circuitry shown in FIG. 5.

Figure 5:
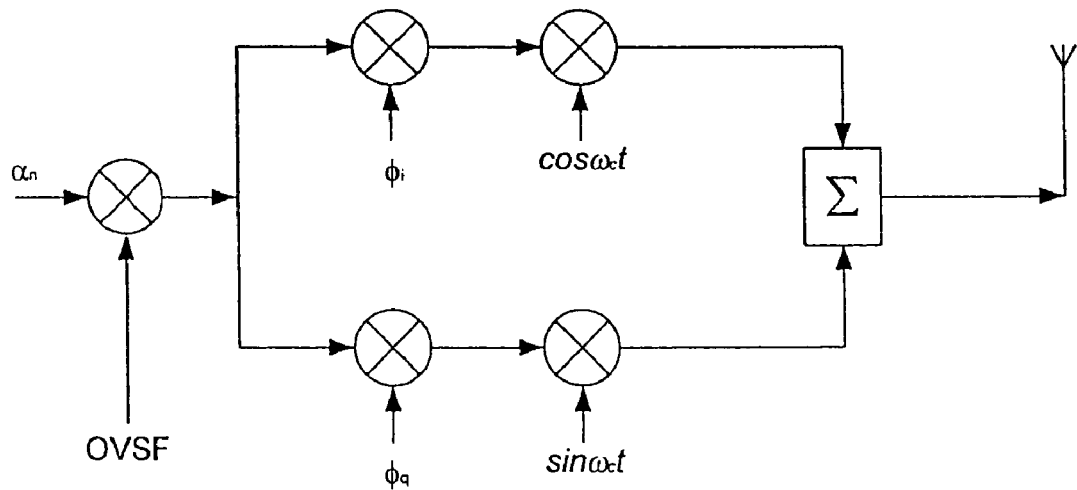
FIG. 5 is a block diagram illustrating the process of modulation and spreading of a communications signal at the transmitter side.

In FIG. 5, the incoming symbols represented by $\alpha_n$ are data-modulated (typically by QPSK) and are also split into in-phase and quadrature components before they are multiplied by the in-phase ($\phi_j$) and quadrature ($\phi_q$) code vectors (orthogonalized scrambling codes+OVF). Once the signal has been spread in this manner, it is transmitted.

As mentioned earlier, the transmitted signal passes through the communications channel and is corrupted by noise (the treatment of which is not dealt with in this context) and also undergoes phase delays and attenuation.

At the transmitter antenna, the signal may be represented as:

$$s(t) = \alpha_n \cdot \phi_i \cos(\omega_c t) + \alpha_n \cdot \phi_q \sin(\omega_c t) \quad (7)$$

where $\alpha_n$ represents the incoming symbols, $\phi_i$, $\phi_q$ the spreading sequence elements.

At the receiver side, the received spread signal may be represented as $$r(t) = \alpha_n \cdot \phi_i \cos(\omega_c t + \xi) + \alpha_n \cdot \phi_q \sin(\omega_c t + \xi) \quad (8)$$

where $\xi$ stands for the delay in phase (and the error in phase) incurred during the transmission as mentioned above.

In order to derive symbol $\alpha_n$ from this signal, analog correlation with a time-synchronized copy of the code is performed and the integration is done over a symbol period.

FIG. 6 is a block diagram of the low-power CDMA receiver circuit 100 according to one embodiment of the present invention, illustrating analog conversion of the code sequences and including three RAKE finger circuits. Referring to FIG. 6, the code replicas are produced as analog quadrature signals to be correlated with the incoming signal. If there is more than one data channel, there will be more than one PN code and the circuit size will increase, however the simple case of a single data channel is considered herein.

The digital code sequences $I_{code1}$ and $Q_{code1}$ are input to respective digital-analog converters (DACs) 130, 132. The resulting analog signals are subjected to lowpass filtering through lowpass filter circuits 134, 136. By mixing of those signals with selected frequency signals $\cos(\omega_c t)$ and $\sin(\omega_c t)$, the analog the code replicas are generated as orthogonal in-phase and quadrature elements $A_{1,I}(t)$, $B_{1,I}(t)$, $A_{1,Q}(t)$, $B_{1,Q}(t)$ (where the numerical subscript denotes the RAKE finger for which the code replica signals are designated).

Since a code-shift in the digital domain implies a time-delay in the analog domain, analog time-delay circuits ($D_1$, $D_2$) are used to provide the shifted codes for the other RAKE fingers. This reduces the number of mixers and DACs used in code replica generation. Moreover, the provision of analog time-delays is feasible even at very high frequencies, wherein transmission lines can be used to provide the necessary time-delays.

Assuming accurate time-synchronization, the code replicas are generated as orthogonal in-phase and quadrature elements. In the analysis below, the generation of the in-phase code element only is shown. In a similar fashion, the Q–(Scrambling code+OVSF) can also be generated.

Expressed mathematically:

$$A(t) = \phi_i \cos(\omega_c t)$$

and $$B(t) = \phi_i \sin(\omega_c t).$$

After this stage, the received signal from Equation (8) is multiplied by A(t) and integrated over a symbol period to yield the in-phase despread signal and similarly with B(t) to yield the quadrature despread signal.

Considering the in-phase portion of the despreading yields:

$$I = \int_0^T [\phi_i \cdot \cos\omega_c t] \cdot [\alpha_n \cdot \{\phi_i \cos(\omega_c t + \xi) + \phi_q \sin(\omega_c t + \xi)\}] dt \quad (9)$$

$$I = \int_0^T [\{\phi_i \cdot \cos(\omega_c t)\} \cdot \{\alpha_n \cdot \phi_i (\cos\omega_c t \cdot \cos\xi - \sin\omega_c t \cdot \sin\xi)\} + \quad (10)$$
$$\{\phi_i \cdot \cos(\omega_c t)\} \cdot \{\alpha_n \cdot \phi_i (\sin\omega_c t \cdot \cos\xi - \cos\omega_c t \cdot \sin\xi)\}] dt.$$

In the Equations (9) and (10) above, correlation is done with $\phi_i \cos((\omega_c t)$ and the received signal has been expanded using $\cos(A+B)$ and $\sin(A+B)$ trigonometric identities.

Splitting the whole integral into four parts, it can be seen that only one term containing the $\phi_i^2$ along with a squared cosine will yield a high correlation value, while the other terms will be close to zero given the orthogonality between the in-phase and quadrature components of the code replicas.

Expressing the above statement mathematically:

$$\int_0^T \cos(\omega_c t) \cdot \sin(\omega_c t) dt = 0 \text{ and } \int_0^T \phi_i \cdot \phi_q dt = 0$$

the required term is given by $$I = \int_0^T \phi_i^2 \cdot \alpha_n \cdot \cos^2\omega_c t \cdot \cos\xi \cdot dt. \quad (11)$$

The terms in the above expression, $\phi_i^2$, $\alpha_n$ and $\cos\xi$ are constants over a symbol period.

Therefore, the integral is much simplified and it can be seen clearly that this term yields a high correlation value that gives the in-phase despread symbol:

$$I = \alpha_n \cdot K \cdot \cos\xi. \quad (12)$$

Similarly, if the correlation of the received signal is done with $\phi_i \sin(\omega_c t)$, the final term left after correlation would be:

$$Q = \alpha_n \cdot K \cdot \sin\xi. \quad (13)$$

So, according to the value of the phase-error $\xi$, either the in-phase or the quadrature element of the despread signal will dominate. I and Q from Equations (12) and (13) along with other corresponding correlation results can be summed to yield the final despread signal.

From the above analysis, it can be inferred that correlation in the described receiver architecture need not necessarily occur at baseband. It can occur at any intermediate (IF) frequency including the carrier frequency as has been shown in the Equations (7)-(13).

The fingers of the RAKE (FIG. 6) are made of code replica generators and the analog time-delays. The multiple paths with different delays and phase-errors are resolved by use of these branches. Effective multipath resolution (multipath diversity) is obtained by properly combining the resulting despread signal. A detailed diagram of the receiver structure 100 is illustrated in FIG. 6 showing three fingers of the RAKE along with the novel way of reducing complexity of the code-replica generation.

After correlation, the despread signal is digitized by an ADC (118) before it is passed for further signal processing. As mentioned above, an advantage in this structure is the removal of the FIR filters that were previously working at four times the chip rate and consuming considerable power. Also, the architecture of a DAC is much simpler than that of an ADC and this makes the overall structure simpler. The use of such architecture therefore reduces the power consumption of the receiver to a great extent. Finally, the ADC operates at the symbol rate of the communications system, which is a much lower rate than required of the ADCs in the conventional receiver circuit structure.

Since correlation can practically be achieved at any intended frequency, the receiver structure can be simplified by omitting the need for down-converting mixers and corresponding low-pass filters. However, the new architecture is flexible in the sense that the same components can be incorporated if correlation has to be done after heterodyning operations.

The receiver architecture according to embodiments of the present invention enables several significant advantages as compared to conventional receiver circuitry, including:

i. In third generation mobile communication systems, spreading factors of up to 256 are used. This clearly means that the ADCs in the receiver of the invention would operate at 1/1024th of the operating frequency of the conventional method that uses four-times over-sampling as mentioned earlier.

Accordingly, the power consumed by the ADCs in the new architecture is lower when compared to that of the standard architecture.

ii. As mentioned earlier, the rate at which the ADCs in the new architecture work (symbol rate) is much lower than the rate at which their counterparts in the standard structure work (four times chip rate). Thus, it could be possible to employ an analog multiplexer and utilize a single ADC for more than one RAKE finger and route the signals accordingly.

iii. The use of DACs in the new architecture does not increase the complexity of the overall structure, as the DACs are structurally simpler and consume lesser power compared to the ADCs.

iv. The method of using analog time-delays, to generate code-shifts in code replica generation reduces the number of DACs and mixers in the process. This technique is advantageous provided the delay spread is in the range of a few microseconds. Large delay spread reduces the advantage of utilizing this technique.

v. Digital techniques typically involve usage of more power compared to analog techniques. Thus, the use of analog correlators decreases the power consumption of the structure and justifies the use of the technique.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The foregoing detailed description of the invention, its principles, operation and embodiments, has been presented by way of example only, and is not intended to be considered limiting to the invention as defined in the appended claims.

What is claimed is:

1. A direct sequence spread spectrum receiver, comprising:
   amplifying and filtering circuitry to obtain a direct sequence spread spectrum received signal;
   a spreading code signal generator circuit to generate an analog spreading code signal;
   analog correlation detection circuitry to detect correlation between said received signal and said spreading code signal to produce an analog correlation signal; and
   analog-to-digital conversion circuitry to generate a digital data signal from said analog correlation signal,
   wherein the spreading code signal generator circuit includes a digital-to-analog converter (DAC) to convert a digital spreading code sequence into a corresponding analog signal, and includes a signal mixer arranged to mix an output from said DAC with a frequency signal to generate said analog spreading code signal.

2. A receiver as claimed in claim 1, further comprising two signal mixers to generate orthogonal analog spreading code signals.

3. A receiver as claimed in claim 2 wherein two spreading code generator circuits are provided having respective orthogonal spreading code sequences as input.

4. A receiver as claimed in claim 2 wherein the analog correlation detection circuitry includes, for each of the orthogonal analog spreading code signals, a mixer to mix the received signal with the analog spreading code signal and an analog integrator, the analog correlation detection circuitry further including an analog summing circuit to generate said correlation signal from outputs of said mixers.

5. A receiver as claimed in claim 1 wherein the analog correlation detection circuitry includes a mixer to mix the received signal with the analog spreading code signal, and an analog integrator to generate said correlation signal from an output of said mixer.

6. A receiver as claimed in claim 1 wherein the analog-to-digital conversion circuitry operates at a symbol frequency of said digital data signal.

7. A code division multiple access RAKE receiver, comprising:
   a plurality of receivers, each receiver including:
      amplifying and filtering circuitry to obtain a direct sequence spread spectrum received signal;
      a spreading code signal generator circuit to generate an analog spreading code signal;
      analog correlation detection circuitry to detect correlation between said received signal and said spreading code signal to produce an analog correlation signal;
      analog-to-digital conversion circuitry to generate a digital data signal from said analog correlation signal,
      wherein the spreading code signal generator circuit includes a digital-to-analog converter (DAC) to convert a digital spreading code sequence into a corresponding analog signal, and includes a signal mixer arranged to mix an output from said DAC with a frequency signal to generate said analog spreading code signal; and
   wherein outputs from the plurality of receivers are combined to generate a single digital data signal output.

8. A RAKE receiver as claimed in claim 7, further comprising time delay elements arranged to delay passage of the analog spreading code signal to the analog correlation detection circuitry for different receivers.

9. A RAKE receiver as claimed in claim 7 wherein each receiver further includes two signal mixers to generate orthogonal analog spreading code signals.

10. A method for receiving and decoding a direct sequence spread spectrum signal in which a digital data signal having a baseband frequency is combined with a digital spreading code sequence and modulated for transmission at a carrier frequency, the method comprising:
    amplifying and filtering a received direct sequence spread spectrum signal;
    generating an analog spreading code signal corresponding to a transmission spreading code sequence;
    performing analog correlation detection between the received signal and the spreading code signal to obtain a correlation signal; and
    applying analog-to-digital conversion to the correlation signal to obtain a replica of the digital data signal, wherein the analog spreading code signal is modulated at said carrier frequency and the analog correlation detection is performed at the carrier frequency.

11. A method as claimed in claim 10 wherein the analog-to-digital conversion of the correlation signal is performed at said baseband frequency.

12. A method as claimed in claim 10 wherein amplifying and filtering, generating, performing, and applying are implemented in a code division multiple access (CDMA) communications system.

13. A method as claimed in claim 12 wherein the CDMA communications system is implemented in a portable telecommunications device.

14. A method for receiving and decoding a direct sequence spread spectrum signal in which a digital data signal having a baseband frequency is combined with a digital spreading code sequence and modulated for transmission at a carrier frequency, the method comprising:
    amplifying and filtering a received direct sequence spread spectrum signal;
    generating an analog spreading code signal corresponding to a transmission spreading code sequence;
    performing analog correlation detection between the received signal and the spreading code signal to obtain a correlation signal; and
    applying analog-to-digital conversion to the correlation signal to obtain a replica of the digital data signal, wherein the analog spreading code signal is modulated at an intermediate frequency, the method including downmixing the received direct sequence spread spectrum signal to said intermediate frequency and performing the analog correlation detection at said intermediate frequency.

15. The method of claim 14 wherein the analog spreading code signal includes orthogonal in-phase and quadrature components for correlation detection with corresponding components of the received signal in an analog domain, with resulting correlation signals combined before application of the analog-to-digital conversion.

16. The method of claim 14 wherein generating the analog spreading code signal includes digital-to-analog converting the digital spreading code sequence.

17. A method for receiving and decoding a direct sequence spread spectrum signal in which a digital data signal having a baseband frequency is combined with a digital spreading code sequence and modulated for transmission at a carrier frequency, the method comprising:
    amplifying and filtering a received direct sequence spread spectrum signal;
    generating an analog spreading code signal corresponding to a transmission spreading code sequence;
    performing analog correlation detection between the received signal and the spreading code signal to obtain a correlation signal; and
    applying analog-to-digital conversion to the correlation signal to obtain a replica of the digital data signal, wherein the analog spreading code signal includes orthogonal in-phase and quadrature components for correlation detection with corresponding components of the received signal in an analog domain, with resulting correlation signals combined before application of the analog-to-digital conversion.

18. A method as claimed in claim 17 wherein generating the analog spreading code signal includes digital-to-analog converting the digital spreading code sequence.

19. A method as claimed in claim 18 wherein generating the analog spreading code signal includes modulating thereof at an intermediate frequency or the carrier frequency.

20. A method as claimed in claim 18 wherein generating the analog spreading code signal includes applying a time delay thereto before use in said correlation detection.

21. A method as claimed in claim 20, further comprising generating a plurality of time delayed analog spreading code signals, and wherein said analog correlation detection and analog-to-digital conversion are performed separately with each spreading code signal in a RAKE receiver.

22. A code division multiple access (CDMA) communication system, comprising:
    a receiver having:
        amplification and filter circuitry to obtain a direct sequence spread spectrum received signal;
        a spreading code signal generator circuit to generate an analog spreading code signal;
        analog correlation detection circuitry coupled to the amplification and filter circuitry and to the spreading code signal generator circuit to detect correlation between said received signal and said spreading code signal to produce an analog correlation signal; and
        analog-to-digital conversion circuitry coupled to the analog correlation detection circuitry to generate a digital data signal from said analog correlation signal;
    wherein the spreading code signal generator circuit includes a digital-to-analog converter (DAC) to convert a digital spreading code sequence into a corresponding analog signal, and includes a signal mixer arranged to mix an output from said DAC with a frequency signal to generate said analog spreading code signal.

23. The system of claim 22 wherein the receiver is implemented in a portable communications device.

24. The system of claim 22 wherein the analog correlation detection circuitry includes a mixer to mix the received signal with the analog spreading code signal, and an analog integrator to generate said correlation signal from an output of said mixer.

25. The system of claim 22 wherein the analog-to-digital conversion circuitry is coupled to operate at a symbol frequency of said digital data signal.

* * * * *